(12) United States Patent
Kantor et al.

(10) Patent No.: US 11,526,667 B2
(45) Date of Patent: Dec. 13, 2022

(54) LANGUAGE-MODEL-BASED DATA AUGMENTATION METHOD FOR TEXTUAL CLASSIFICATION TASKS WITH LITTLE DATA

(71) Applicant: International Business Machines Corporation, Armonk, NY (US)

(72) Inventors: Amir Kantor, Haifa (IL); Ateret Anaby Tavor, Givat Ada (IL); Boaz Carmeli, Koranit (IL); Esther Goldbraich, Haifa (IL); George Kour, Tel Aviv (IL); Segev Shlomov, Haifa (IL); Naama Tepper, Koranit (IL); Naama Zwerdling, Pardes Hana (IL)

(73) Assignee: International Business Machines Corporation, Armonk, NY (US)

(*) Notice: Subject to any disclaimer, the term of this patent is extended or adjusted under 35 U.S.C. 154(b) by 245 days.

(21) Appl. No.: 16/870,917

(22) Filed: May 9, 2020

(65) Prior Publication Data
US 2021/0350076 A1   Nov. 11, 2021

(51) Int. Cl.
*G06F 40/279* (2020.01)
*G06N 5/04* (2006.01)
*G06N 20/00* (2019.01)

(52) U.S. Cl.
CPC ......... *G06F 40/279* (2020.01); *G06N 5/04* (2013.01); *G06N 20/00* (2019.01)

(58) Field of Classification Search
CPC ................. G06N 5/04; G06N 20/00
See application file for complete search history.

(56) References Cited

U.S. PATENT DOCUMENTS

| | | | |
|---|---|---|---|
| 8,165,870 B2* | 4/2012 | Acero | G06F 40/216 704/235 |
| 2017/0293607 A1 | 10/2017 | Kolotienko | |
| 2017/0293687 A1 | 10/2017 | Kolotienko | |
| 2018/0018576 A1* | 1/2018 | Boyer | G06N 20/00 |
| 2018/0197530 A1 | 7/2018 | Baughman | |

(Continued)

OTHER PUBLICATIONS

Peng et al. "Data Augmentation for Spoken Language Understanding via Pretrained Models". arXiv:2004.13952v1 [cs.CL] Apr. 29, 2020 (Year: 2020).*

(Continued)

*Primary Examiner* — Jesse S Pullias

(57) ABSTRACT

Embodiments of the present systems and methods may provide techniques for augmenting textual data that may be used for textual classification tasks. Embodiments of such techniques may provide the capability to synthesize labeled data to improve text classification tasks. Embodiments may be specifically useful when only a small amount of data is available, and provide improved performance in such cases. For example, in an embodiment, a method implemented in a computer system may comprise a processor, memory accessible by the processor, and computer program instructions stored in the memory and executable by the processor, and the method may comprise fine-tuning a language model using a training dataset, synthesizing a plurality of samples using the fine-tuned language model, filtering the plurality of synthesized samples, and generating an augmented training dataset comprising the training dataset and the filtered plurality of synthesized sentences.

17 Claims, 3 Drawing Sheets

(56) References Cited

U.S. PATENT DOCUMENTS

| | | | |
|---|---|---|---|
| 2019/0266244 A1 | 8/2019 | Scally | |
| 2020/0065384 A1* | 2/2020 | Costello | G06N 3/0445 |
| 2020/0226212 A1* | 7/2020 | Tan | G06F 16/35 |
| 2021/0142181 A1* | 5/2021 | Liu | G06N 3/08 |

OTHER PUBLICATIONS

Bengio, Y.; Ducharme, R.; Vincent, P.; and Jauvin, C., Feb. 2003. A neural probabilistic language model. Journal of machine learning research 3(Feb):1137-1155.
Xie, Z.; Wang, S. I.; Li, J.; L'Evy, D.; Nie, A.; Jurafsky, D.; and Ng, A. Y., Mar. 2017. Data noising as smoothing in neural network language models. In Proceedings of the Fifth International Conference on Learning Representations., arXiv:1703.02573v1 [cs.LG].
Wu, X.; Lv, S.; Zang, L.; Han, J.; and Hu, S. 2019. Conditional bert contextual augmentation. In International Conference on Computational Science, 84-95. Springer. arXiv:1812.06705v1 [cs.CL].
Wong, S. C.; Gatt, A.; Stamatescu, V.; and McDonnell, M. D., Sep. 2016. Understanding data augmentation for classification: when to warp? In 2016 international conference on digital image computing: techniques and applications (DICTA), 1-6. IEEE.
Wei, J. W., and Zou, K., Nov. 2019. Eda: Easy data augmentation techniques for boosting performance on text classification tasks. In Seventh International Conference on Learning Representations, ICLR 2019 Workshop LLD.
Vaswani, A.; Shazeer, N.; Parmar, N.; Uszkoreit, J.; Jones, L; Gomez, A. N.; Kaiser, L.; and Polosukhin, I., Jun. 2017. Attention is all you need. In Advances in neural information processing systems, 5998-6008.
Jungiewicz, M., and Smywinski-Pohl, A. 2019. Towards textual data augmentation for neural networks synonyms and maximum loss. Computer Science 20(1).
Kingma, D. P., and Welling, M., Dec. 2014. Auto-encoding variational bayes. stat 1050:10.
Tanaka, F. H. K. D. S., and Aranha, C., Apr. 2019. Data augmentation using gans. arXiv preprint arXiv:1904.09135.
Kobayashi, S. 2018. Contextual augmentation: Data augmentation bywords with paradigmatic relations. In Proceedings of the 2018 Conference of the North American Chapter of the Association for Computational Linguistics Human Language Technologies, vol. 2 (Short Papers), 452-457.
Radford, A.; Wu, J.; Child, R.; Luan, D.; Amodei, D.; and Sutskever, I. 2019. Language models are unsupervised multitask learners. OpenAI Blog 1:8.
Kumar, A.; Bhattamishra, S.; Bhandari, M.; and Talukdar, P., Jun. 2019. Submodular optimization-based diverse paraphrasing and its effectiveness in data augmentation. In Proceedings of the 2019 Conference of the North American Chapter of the Association for Computational Linguistics: Human Language Technologies, vol. 1 (Long and Short Papers), 3609-3619.
Radford, A.; Narasimhan, K.; Salimans, T.; and Sutskever, I. 2018. Improving language understanding by generative pre-training. URL https://s3-us-west-2.amazonaws.com/openaiassets/research-covers/languageunsupervised/language understanding paper. pdf.
Marivate, V., and Sefara, T., Jul. 2019. Improving short text classification through global augmentation methods. arXiv preprint arXiv:1907.03752.

* cited by examiner

LANGUAGE-MODEL-BASED DATA AUGMENTATION METHOD FOR TEXTUAL CLASSIFICATION TASKS WITH LITTLE DATA

BACKGROUND

The present invention relates to techniques for augmenting textual data that may be used for textual classification tasks.

Text classification may include tasks such as the classification of emails into spam and not-spam. It may encompass a variety of other tasks such as intent classification, sentiment analysis, topic classification, relation classification, etc. Depending upon the problem at hand, good fit of a classifier model may require relatively large amounts of labeled data. However, in many cases, and especially when developing machine learning or other AI systems for specific applications, labeled data may be scarce and costly to obtain. One example is intent classification in the growing market of automated chatbot platforms. In this example, a developer of an intent classifier for a new chatbot may start with a dataset containing 2, 3, or 5 samples per class, and in some cases no data at all.

Data augmentation is a common strategy for handling scarce data situations. Data augmentation may include synthesizing new data from existing training data with the objective of improving the performance of the downstream model. This strategy has been a key factor in performance improvement of various neural network models, mainly in the domains of computer vision and speech recognition. Specifically, for these domains there exist well-established and conventional labeled-data synthesizing methods for improving classification tasks, among others. The simpler of these methods include applying transformations on existing training examples, such as cropping, padding, flipping, and shifting along time and space dimensions, as these transformations are usually class preserving. However, for textual data, such transformations usually invalidate and distort the text, making it grammatically and semantically incorrect, hence, making data augmentation more challenging. In fact, textual augmentation may do more harm than good, as it is not an easy task to synthesize good artificial textual data. Thus, data augmentation methods for text usually involve replacing a single word with a synonym, deleting a word, or changing word order.

Accordingly, a need arises for techniques for augmenting textual data that may be used for textual classification tasks.

SUMMARY

Embodiments of the present systems and methods may provide techniques for augmenting textual data that may be used for textual classification tasks. Embodiments of such techniques may provide the capability to synthesize labeled data to improve text classification tasks. Embodiments may be specifically useful when only a small amount of data is available, and provide improved performance in such cases.

For example, in an embodiment, a method implemented in a computer system may comprise a processor, memory accessible by the processor, and computer program instructions stored in the memory and executable by the processor, and the method may comprise fine-tuning a language model using a training dataset, synthesizing a plurality of samples using the fine-tuned language model, filtering the plurality of synthesized samples, and generating an augmented training dataset comprising the training dataset and the filtered plurality of synthesized sentences.

In embodiments, fine-tuning of the language model may comprise concatenating sentences in the training dataset according to: $U^* = y_1 \text{ SEP } x_1 \text{ EOS } y_2 \text{ SEP } x_2 \text{ EOS } y_3 \ldots y_n \text{ SEP } x_n \text{ EOS}$, wherein SEP is an auxiliary token that separates between a class label and a corresponding sentence, and EOS is a token terminates a sentence and separates it from a label that follows; and synthesizing a plurality of samples may comprise generating a set of new labeled sentences starting from "y SEP". The training dataset may comprise a small quantity of training data. The language model may be pre-trained on a large quantity of training data. The fine-tuning may comprise adapting the language model to the linguistic domain of the training dataset. The plurality of synthesized samples may be filtered using a classifier model trained using the training dataset to score the quality of the synthesized samples. The plurality of synthesized samples may be filtered using a filtering method selected from a sentence length, vocabulary constraints, plausibility, and human filtering.

In an embodiment, a system may comprise a processor, memory accessible by the processor, and computer program instructions stored in the memory and executable by the processor to perform fine-tuning a language model using a training dataset, synthesizing a plurality of samples using the fine-tuned language model, filtering the plurality of synthesized samples, and generating an augmented training dataset comprising the training dataset and the filtered plurality of synthesized sentences.

In an embodiment, a computer program product may comprise a non-transitory computer readable storage having program instructions embodied therewith, the program instructions executable by a computer, to cause the computer to perform a method that may comprise fine-tuning a language model using a training dataset, synthesizing a plurality of samples using the fine-tuned language model, filtering the plurality of synthesized samples, and generating an augmented training dataset comprising the training dataset and the filtered plurality of synthesized sentences.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Figure 1:
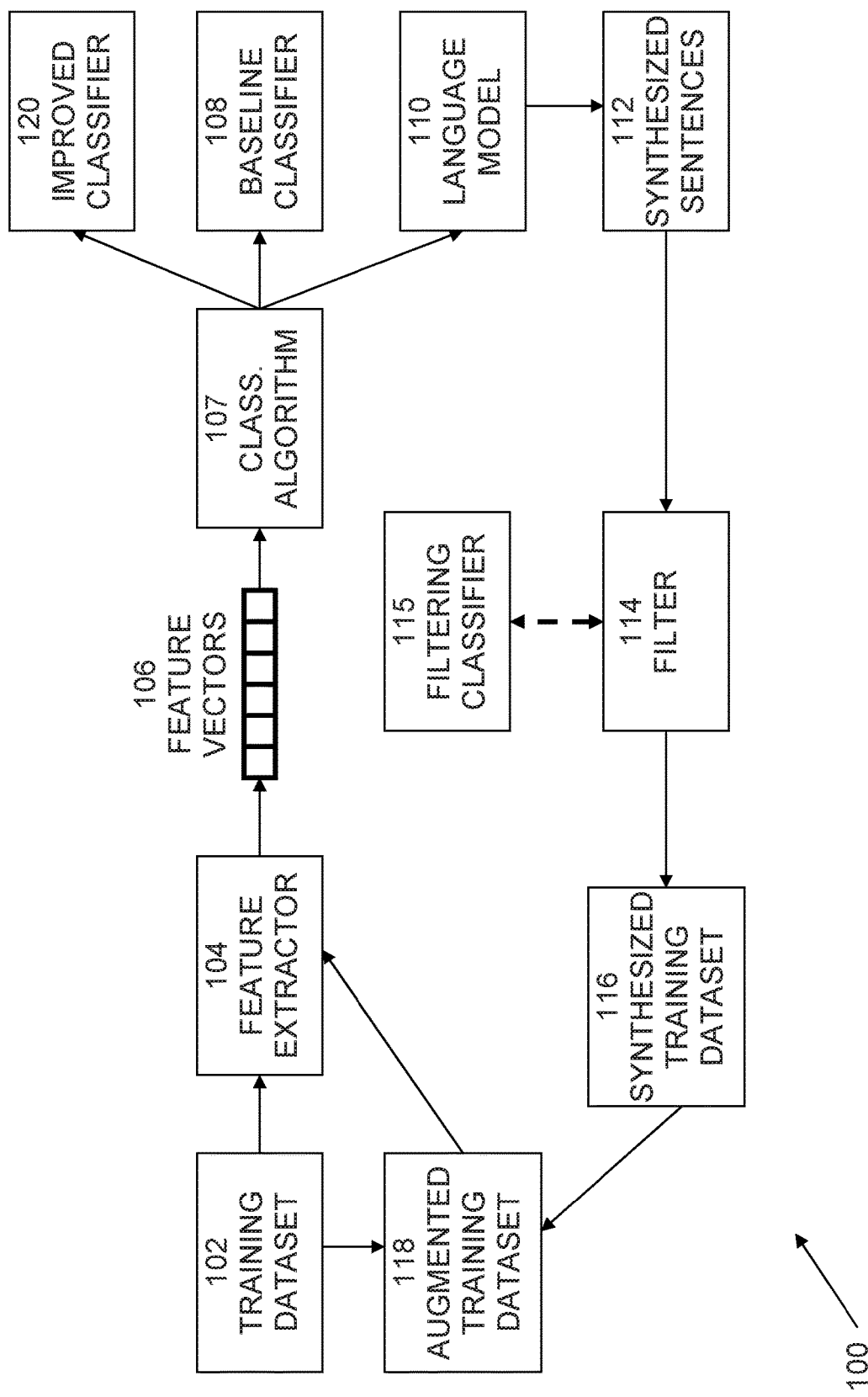
FIG. 1 is an exemplary block diagram of a data classification system according to embodiments of the present systems and methods.

Embodiments of the present systems and methods may provide techniques for augmenting textual data that may be used for textual classification tasks. Embodiments of such techniques may provide the capability to synthesize labeled data to improve text classification tasks. Embodiments may be specifically useful when only a small amount of data is available, and provide improved performance in such cases.

Embodiments may include a data augmentation pipeline that builds upon a powerful language model—generative pre-training (GPT) model. This neural-network model may be pre-trained on huge bodies of text. As such, it captures the structure of natural language to a great extent, producing deeply coherent sentences and paragraphs. Embodiments may adapt GPT by fine-tuning it on the existing, small, training data set. Embodiments may then use the fine-tuned model to synthesize new labeled sentences. Independently, embodiments may train a classifier on the same original small train dataset and use it to filter the synthesized data corpus, retaining only data that appears to be qualitative enough. Further, embodiments may retrain the task classifier on both the existing and synthesized data.

Text classification is an instance of the supervised learning problem over textual data. In this context, we are given a training dataset $D_{train}=\{(x_i,y_i)\}_{i=1}^n$ containing n labeled sentences. Each $x_i$ is a string of text, or, specifically, a sequence of tokens (roughly, words) $x_i^1 \ldots x_i^{l_i}$, and the label $y_i \in \{1, \ldots, q\}$ indicates the class of $x_i$ among a set of q classes. Each $x_i$ is drawn independently from the entire set of strings X (that is, $x_i \in X$), according to an unknown distribution on X, denoted by $P_X$. Moreover, it is assumed that there is an unknown function $f: X \to \{1, \ldots q\}$, and that in $D_{train}$, $y_i = f(x_i)$ for all i=1, ..., n.

The objective of a supervised learning problem is to approximate $f$ on the entire X, given only the dataset $D_{train}$. That is, generalizing from the domain of $D_{train}$ to the entire X. Formally, a classification algorithm A receives the training dataset $D_{train}$, and after a training period, it outputs a classifier function $h = \mathcal{A}(D_{train})$, whereas h: $X \to \{1, \ldots, q\}$, also known as a hypothesis. In order to estimate to what extent h approximates $f$ on X, it is customary to initially leave out, in addition to the training dataset $D_{train}$, a test dataset $D_{test}=\{(\hat{x}_i,\hat{y}_i)\}_{i=1}^{\hat{n}}$, which is chosen randomly and has the same structure as $D_{train}$. Both parts are usually drawn from a single, grand, dataset. There are different ways of measuring the quality of classifier h as an approximation to $f$ using $D_{test}$. The most straightforward way is accuracy:

$$\frac{1}{\hat{n}}\sum_{i=1}^{\hat{n}} \delta(h(\hat{x}_i), \hat{y}_i),$$

where $\delta(\cdot,\sim)$ is the Kronecker delta (equals 1 when both arguments are equal, or 0 otherwise), and $\hat{x}_i$, $\hat{y}_i$ are drawn from the test set. When the test set is large, accuracy approximates the probability of having h(x) equal $f(x)$, namely, $P_X(h(x)=f(x))$. Accuracy may be used as an estimate of classifier performance.

Regardless of how performance is measured, if the training set $D_{train}$ is small, it will dramatically affect the performance of the algorithm $\mathcal{A}$. Data augmentation tries to solve this problem by synthesizing additional training pairs that, together with the existing dataset, better reflect the underlying distribution of the data while refraining from introducing too much noise.

The present techniques do not directly relate to the classification algorithm per se. Rather, given a training dataset $D_{train}$ and an algorithm $\mathcal{A}$, the present techniques may provide a general method to synthesize an artificial dataset, $D_{synthesized}$. The goal may be that applying algorithm $\mathcal{A}$ on $D_{train} \cup D_{synthesized}$, denoted by $\bar{h}=\mathcal{A}(D_{train} \cup D_{synthesized})$, would yield a relatively good classifier, and particularly, better than the baseline classifier h.

An exemplary system 100 in which the present techniques may be implemented is shown in FIG. 1. In this example, system 100 may include training dataset 102 ($D_{train}$), feature extractor 104, feature vectors 106, classification algorithm ($\mathcal{A}$) baseline classifier 108 (h), language model 110 ($\mathcal{G}$), synthesized sentences 112, filter 114, synthesized training dataset 116, augmented training data 118, and improved classifier 120. Training dataset $D_{train}$ 102 may include one or more small training datasets, perhaps miniature, with, for example, only a few examples per class. Feature extractor 104 may extract features from the input data to generate feature vectors 106. Feature vectors 106 may be input to classification algorithm $\mathcal{A}$ 107 to train, first baseline classifier 108 using training dataset 120, and later improved classifier 120 using augmented training dataset 118. Further, feature vectors 106 may be input to language model $\mathcal{G}$ 110 to fine tune model $\mathcal{G}$ 110 to form $\mathcal{G}_{tuned}$ 110, which may then be used to generate synthesized sentences 112. Synthesized sentences 112 may be filtered 114 to form synthesized training dataset 116. Then the union of training dataset 102 and synthesized training dataset 116 may form augmented training dataset 118, which may be used to train improved classifier 120. This process is described in greater detail below.

Figure 2:
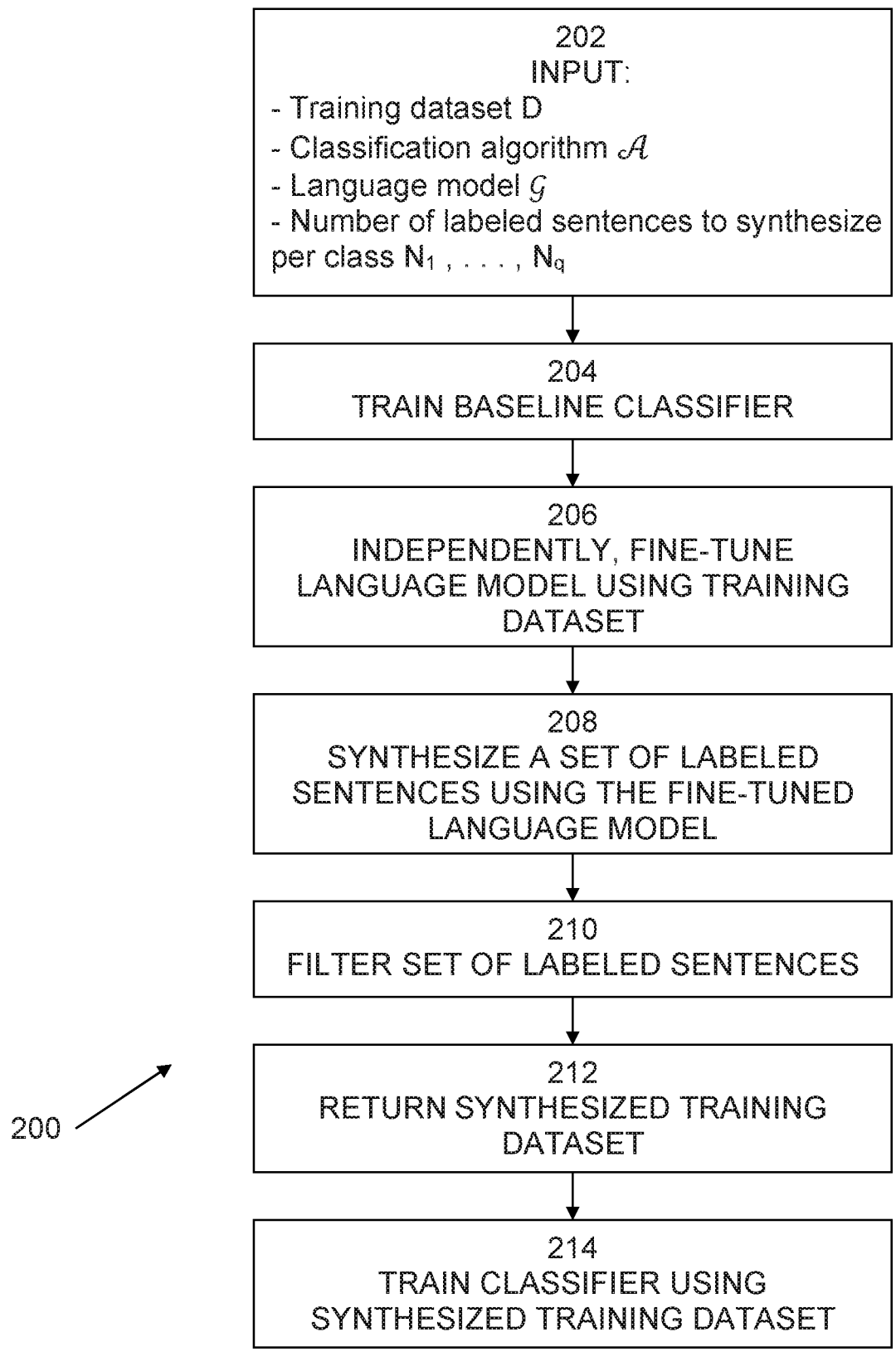
FIG. 2 is an exemplary flow diagram of data classification process, according to embodiments of the present systems and methods.

An exemplary flow diagram a process 200 of generating $D_{synthesized}$ from $D_{train}$ 102 and $\mathcal{A}$ is shown in FIG. 2. It is best viewed in conjunction with FIG. 1. Embodiments may be specifically tailored to the case of small training sets, perhaps miniature, with only a few examples per class. Process 200 begins with 202, in which input data may be obtained or received. The main input for process 200 is a training dataset $D_{train}$ 102, which may be augmented with synthesized data 116. $D_{train}$ 102 contains a set of sentences, each labeled with a class label. Moreover, in order to train a classifier, a training algorithm $\mathcal{A}$ 107 may be used. As far as process 200 is concerned, $\mathcal{A}$ 107 is arbitrary. However, embodiments may synthesize data that is optimized for the algorithm $\mathcal{A}$ 107, and the latter is given as a second input to process 200. This is a distinctive feature of our method. Both $D_{train}$ 102 and $\mathcal{A}$ 107 are described below.

In order to synthesize new data, embodiments may use pre-defined language model $\mathcal{G}$ 110. A language model is an estimate of the probability of the appearance of a token (word), in accordance with a given distribution of text $P_{text}$, conditioned on the preceding and/or succeeding tokens. More formally, given a token w, and the preceding k tokens (or fewer) $w^1, \ldots, w^k$, one would like $\mathcal{G}(w|w^1, \ldots, w^k)$ to approximate the conditional probability $P_{text}(w|w^1, \ldots, w^k)$ of the appearance of w in accordance with $P_{text}$. $\mathcal{G}$ 110 is usually calculated using a concrete corpus of text U, sampled from distribution $P_{text}$.

In contrast to $\mathcal{A}$ 107, $\mathcal{G}$ 110 is far from being arbitrary. From a generality perspective, different types of language models and even different sizes of the same language models can be used. The only requirement is that it should be a generative language model pre-trained on a large corpus so that small corpus would be enough to finetune it. For example, embodiments may use GPT-2—a recent pre-trained neural-network model, where $D_{train}$ 102 is scarce. Of course, GPT-2 is merely an example of a suitable language model that may be used. GPT-2 is pre-trained on an enormous body of text, downloaded from the Web. The corpus is organized as a long sequence of tokens, and denoted by $U=w^1 \ldots w^j \ldots$, GPT-2, like GPT, is a right-to-left model based on the transformer architecture. It is pre-trained on U with loss defined by $$J_\theta = -\sum_j \log P_\theta(w^j \mid w^{j-k}, \ldots, w^{j-1}),  \quad (1)$$

where $\theta$ is the set of learnable parameters in the neural network of GPT2, and $P_\theta$ is the trained language model—an estimate of the conditional probability distribution on the set of tokens, as calculated by the network. Specifically, take $\mathcal{G} = P_{\theta^*}$, where $\theta^*$ indicates the state of the learnable parameters after pre-training. Nonetheless, from a technical standpoint, the language model and its underlying technology can differ to a great extent, and it is thus presented as a third input to process 200. Finally, process 200 may be given the number of labeled sentences to synthesize per class $N_1, \ldots, N_q$.

At 204, a baseline classifier h 108 may be trained. This is the classifier model that is to be improved by process 200. For example, a baseline classifier $h = \mathcal{A}(D_{train})$ may be trained using the existing data $D_{train}$ 102.

At 206, language model $\mathcal{G}$ 110 may be fine-tuned independently of 204 in a way that is specific to the problem at hand, and to the data that is to be generated. As 204 and 206 are performed independently, embodiments may perform 204 and 206 in parallel or serially in any order. In embodiments, language model $\mathcal{G}$ 110 may be fine-tuned to the task of synthesizing labeled sentences, so as to obtain the adapted language model $\mathcal{G}_{tuned}$ 110. In embodiments, $\mathcal{G}$ may be specifically adapted to the linguistic domain of $D_{train}$ 102 (that is, the sentences, vocabulary, style, etc.), as well as the particular classes in $D_{train}$ 102. Generally speaking, $\mathcal{G}_{tuned}$ 110 may be used in order to generate a set of sentences, each labeled with a class label, of any size.

Fine-tuning involves further training the language model g 110 (for example, GPT2), in order to adjust to a different distribution of words in the language—corresponding to the data generation task. In embodiments, $\mathcal{G}$ 110 is the neural model of GPT-2. In this step, we fine-tune GPT-2 by training it using the data in $D_{train} = \{(x_i, y_i)\}_{i=1}^n$. The training method that may be used does not need to change, however. In embodiments, the sentences in $D_{train}$ 102 may be concatenated into a long chain in order to form U*, in the following way (where SEP and EOS are token separators):

$$U^* = y_1 \text{SEP} x_i \text{EOS} y_2 \text{SEP} x_2 \text{EOS} y_3 \ldots y_n \text{SEP} x_n \text{EOS} \quad (2)$$

Here, the auxiliary token SEP separates between a class label and a corresponding sentence, while token EOS terminates a sentence, and separates it from the label that follows. Embodiments may further train the learnable parameters of GPT-2 to predict the next token. Embodiments may perform additional training in the same way that GPT-2 was pre-trained on a huge linguistic corpus—using the loss function in Equation 1 (with the same training procedure and hyperparameters). Fine tuning adjusts it to the language, and the distribution of words, within the domain of dataset $D_{train}$ 102, and within its different classes. However, U* may be used instead of U, and the learnable parameters are already initialized. The resulting language model is referred to as $\mathcal{G}_{tuned}$ 110.

At 208, using the fine-tuned language model $\mathcal{G}_{tuned}$, a set 112 of new labeled sentences may be synthesized. Specifically, for each classy, sentences 112 may be synthesized by letting $\mathcal{G}_{tuned}$ generate sentences starting from "y SEP". This corresponds to how $\mathcal{G}_{tuned}$ was fine-tuned in 206. For example, a set of labeled sentences may be synthesized, denoted by $D^* = \{(x_i', y_i')\}_{i=1}^n$, and may have the same structure as $D_{train}$ 102. The exact number of sentences that are generated per class may be determined in various ways. One way is synthesizing, for example, for each class y, ten times (or any other factor) more sentences than are to be added to the class (for example, $10N_y$). Accordingly, the total number of generated sentences is $N = 10\Sigma_{y=1}^q N_y$. More sophisticated heuristics may be utilized. This is also where the power of GPT-2 comes into play. GPT-2 generates labeled sentences 112 that are, generally speaking, both high quality and diverse, facilitating the relative success of our method.

At 210, the synthesized data 112 may be filtered 114 using, for example, filtering classifier 115. It is important to clarify that baseline classifier 108 and filtering classifier 115 that is being used to score the sentences are independent and need not implement the same classification algorithm. Baseline classifier and improved or augmented classifier 120 are being used for assessing the value of the synthesized data, while filtering classifier 115 (also known as scorer) is being used to determine what ends up in the synthesized data. Note that (in an embodiment) filtering may be done in two steps: first a classifier 115 (the filter or scorer classifier) may be used score the generated sentences, and then a filtering method 114, which may be any one of various methods, may be applied to leave only some of the sentences, based on their scores. Filtering may be done by methods that do not use filtering classifier 115. For example, embodiments may use simple heuristic methods, such as sentence length, vocabulary constraints, plausibility, etc., or more complex filtering techniques, even including human filtering, etc.

The major obstacle to using synthesized text is the noise and error it may introduce. Here, embodiments may filter the data in D*, which was synthesized by $\mathcal{G}_{tuned}$ 110 at 208, leaving only the instances of the highest quality to form synthesized training dataset $D_{synthesized}$ 116.

For each class y, the top $N_y$ sentences from D* that are labeled by y may be selected, as follows: Given a synthesized sentence $(x,y) \in D^*$, first verify that $h(x) = y$ (the predicted class matches), and then, the confidence score given by h serves as a rank for $(x,y)$. Thus, the top ranked $N_y$ sentences for class y may be selected. At 212, this may result in a synthesized dataset $D_{synthesized} \subseteq D^*$, consisting of labeled sentences and having the same structure as $D_{train}$ 102. The confidence score given to a data instance by h may be regarded as the extent the instance is conservative with respect to h. h, in turn, takes into account both $D_{train}$ 102 and the algorithm $\mathcal{A}$ that is to be used with the augmented dataset. Note, however, that $\mathcal{G}_{tuned}$ 110 generates sentences conditioned on a class label. This may provide a sort of double voting mechanism.

At 214, $D_{synthesized}$ 116 may be used to train or re-train baseline classifier 108, or similar classifier model, to form improved classifier 120. Process 200 may generally be repeated, and may be further applied on $D_{train}$ 102 $[D_{synthesized}$ to obtain $D_{synthesized}'$, $D_{synthesized}''$ and so on, so as to further improve improved classifier 120.

In order to assess the quality of $D_{synthesized}$ 116, one may train a classifier on $D \cup D_{synthesized}$ (using the classification algorithm 107 that was given as input to process 200), and check its performance one way or another (for example, via the accuracy of $F_\alpha$). This may be compared with the performance of the baseline classifier h, which was trained at 204 of process 200 on D alone.

For example, in a series of experiments on several datasets (3) and several classification algorithms (SVM, LSTM, BERT), the effectiveness of the present techniques was verified. First, embodiments may be more effective when the available data D contains a small number of examples per class (5-10). Second, for any size of D that was tested, the augmented data outperformed the baseline. Third, when D is small, embodiments outperformed in most circumstances all conventional methods for textual data augmentation that were tested (EDA, CBERT, CVAE).

Figure 3:
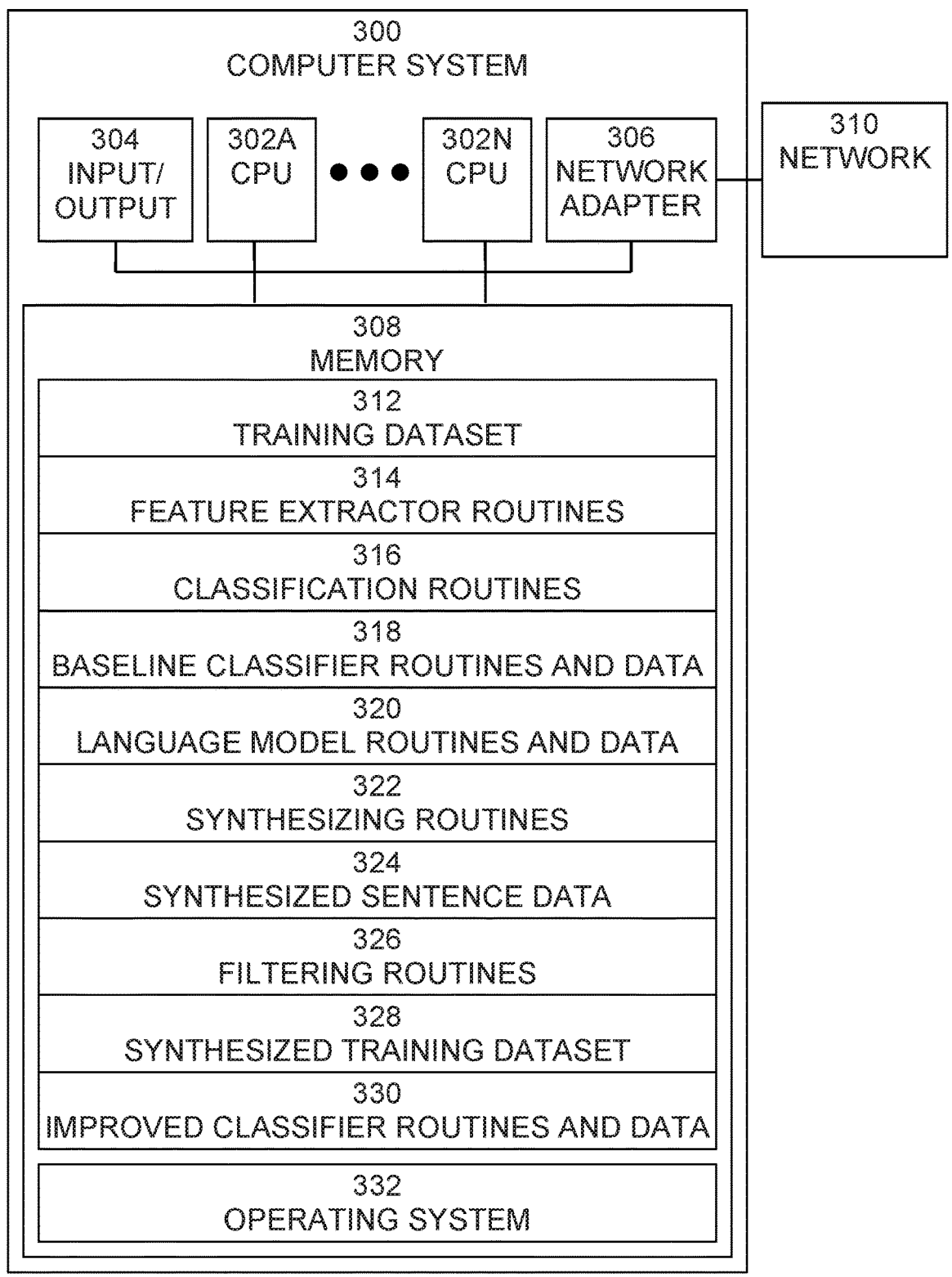
FIG. 3 is an exemplary block diagram of a computer system, in which processes involved in the embodiments described herein may be implemented.

An exemplary block diagram of a computer system 300, in which processes involved in the embodiments described herein may be implemented, is shown in FIG. 3. Computer system 300 may be implemented using one or more programmed general-purpose computer systems, such as embedded processors, systems on a chip, personal computers, workstations, server systems, and minicomputers or mainframe computers, or in distributed, networked computing environments. Computer system 300 may include one or more processors (CPUs) 302A-302N, input/output circuitry 304, network adapter 306, and memory 308. CPUs 302A-302N execute program instructions in order to carry out the functions of the present communications systems and methods. Typically, CPUs 302A-302N are one or more microprocessors, such as an INTEL CORE® processor. FIG. 3 illustrates an embodiment in which computer system 300 is implemented as a single multi-processor computer system, in which multiple processors 302A-302N share system resources, such as memory 308, input/output circuitry 304, and network adapter 306. However, the present communications systems and methods also include embodiments in which computer system 300 is implemented as a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 306 interfaces device 300 with a network 310. Network 310 may be any public or proprietary LAN or WAN, including, but not limited to the Internet.

Memory 308 stores program instructions that are executed by, and data that are used and processed by, CPU 302 to perform the functions of computer system 300. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 308 may vary depending upon the function that computer system 300 is programmed to perform. In the example shown in FIG. 3, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 3, memory 308 may include training dataset 312, feature extractor routines 314, classification routines 316, baseline classifier routines and data 318, language model routines and data 320, synthesizing routines 322, synthesized sentence data 324, filtering routines 326, synthesized training dataset 328, improved classifier routines and data 330, and operating system 322. Training dataset 312 may include one or more small training datasets, perhaps miniature, with, for example, only a few examples per class according to embodiments of the present systems and methods, as described above. Feature extractor routines 314 may extract features from the input data to generate feature vectors according to embodiments of the present systems and methods, as described above. The feature vectors may be input to classification routines 316, which may implement a classification algorithm to train classifiers according to embodiments of the present systems and methods, as described above. Baseline classifier routines and data 318 may implement a classifier model that is to be trained according to embodiments of the present systems and methods, as described above. Language model routines and data 320 may implement a language model, which is an estimate of the probability of the appearance of a token (word), in accordance with a given distribution of text conditioned on the preceding and/or succeeding tokens according to embodiments of the present systems and methods, as described above. Synthesizing routines 322 may generate synthesized sentence data 324 using language model routines and data 320 according to embodiments of the present systems and methods, as described above. Filtering routines 326 may utilize baseline classifier routines and data 318 to select sentences from synthesized sentence data 324 and combined with training dataset 312 to form synthesized training dataset 328 according to embodiments of the present systems and methods, as described above. Improved classifier routines and data 330 may implement a classifier model that has been trained using synthesized training dataset 328 according to embodiments of the present systems and methods, as described above. Operating system routines 322 may provide additional system functionality.

As shown in FIG. 3, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2@, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented in a computer system comprising a processor, memory accessible by the processor, and computer program instructions stored in the memory and executable by the processor, the method comprising:
   fine-tuning a language model using a training dataset, wherein fine-tuning of the language model comprises:
      concatenating sentences in the training dataset according to:

$U^* = y_1 SEP x_i EOS y_2 SEP x_2 EOS y_3 \ldots y_n SEP x_n EOS$ wherein SEP is an auxiliary token that separates between a class label and a corresponding sentence and EOS is a token that terminates a sentence and separates it from a label that follows;
   synthesizing a plurality of samples using the fine-tuned language model, wherein synthesizing a plurality of samples comprises: generating a set of new labeled sentences starting from "y SEP";
   filtering the plurality of synthesized samples; and
   generating an augmented training dataset comprising the training dataset and the filtered plurality of synthesized sentences.

2. The method of claim 1, wherein the training dataset comprises a small quantity of training data.

3. The method of claim 2, wherein the language model is pre-trained on a large quantity of training data.

4. The method of claim 3, wherein the fine-tuning comprises adapting the language model to the linguistic domain of the training dataset.

5. The method of claim 4, wherein the plurality of synthesized samples is filtered using a classifier model trained using the training dataset to score the quality of the synthesized samples.

6. The method of claim 4, wherein the plurality of synthesized samples is filtered using a filtering method selected from a sentence length, vocabulary constraints, plausibility, and human filtering.

7. A system comprising a processor, memory accessible by the processor, and computer program instructions stored in the memory and executable by the processor to perform:
   fine-tuning a language model using a training dataset, wherein fine-tuning of the language model comprises:
      concatenating sentences in the training dataset according to:

$U^* = y_1 SEP x_i EOS y_2 SEP x_2 EOS y_3 \ldots y_n SEP x_n EOS$ wherein SEP is an auxiliary token that separates between a class label and a corresponding sentence and EOS is a token that terminates a sentence and separates it from a label that follows;
   synthesizing a plurality of samples using the fine-tuned language model, wherein synthesizing a plurality of samples comprises: generating a set of new labeled sentences starting from "y SEP";
   filtering the plurality of synthesized samples; and
   generating an augmented training dataset comprising the training dataset and the filtered plurality of synthesized sentences.

8. The system of claim 7, wherein the training dataset comprises a small quantity of training data.

9. The system of claim 8, wherein the language model is pre-trained on a large quantity of training data.

10. The system of claim 9, wherein the fine-tuning comprises adapting the language model to the linguistic domain of the training dataset.

11. The system of claim 10, wherein the plurality of synthesized samples is filtered using a classifier model trained using the training dataset to score the quality of the synthesized samples.

12. The system of claim 10, wherein the plurality of synthesized samples is filtered using a filtering method selected from a sentence length, vocabulary constraints, plausibility, and human filtering.

13. A computer program product comprising a non-transitory computer readable storage having program instructions embodied therewith, the program instructions executable by a computer, to cause the computer to perform a method comprising:
   fine-tuning a language model using a training dataset, wherein fine-tuning of the language model comprises:
      concatenating sentences in the training dataset according to:

$U^* = y_1 SEP x_i EOS y_2 SEP x_2 EOS y_3 \ldots y_n SEP x_n EOS$ wherein SEP is an auxiliary token that separates between a class label and a corresponding sentence and EOS is a token that terminates a sentence and separates it from a label that follows;
   synthesizing a plurality of samples using the fine-tuned language model, wherein synthesizing a plurality of samples comprises: generating a set of new labeled sentences starting from "y SEP";
   filtering the plurality of synthesized samples; and
   generating an augmented training dataset comprising the training dataset and the filtered plurality of synthesized sentences.

14. The computer program product of claim 13, wherein the training dataset comprises a small quantity of training data.

15. The computer program product of claim 14, wherein the language model is pre-trained on a large quantity of training data.

16. The computer program product of claim 15, wherein the fine-tuning comprises adapting the language model to the linguistic domain of the training dataset.

17. The computer program product of claim 16, wherein the plurality of synthesized samples is filtered using a filtering method selected from a classifier model trained using the training dataset to score the quality of the synthesized samples, a sentence length, vocabulary constraints, plausibility, and human filtering.

* * * * *